US 9,923,381 B2

(12) United States Patent
Walley et al.

(10) Patent No.: US 9,923,381 B2
(45) Date of Patent: Mar. 20, 2018

(54) RESONANT TUNING THROUGH RECTIFIER TIME SHIFTING

(71) Applicant: Avago Technologies General IP (Singapore) Pte. Ltd., Singapore (SG)

(72) Inventors: John Stuart Walley, Ladera Ranch, CA (US); Ryan Michael Desrosiers, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 864 days.

(21) Appl. No.: 14/243,411

(22) Filed: Apr. 2, 2014

(65) Prior Publication Data

US 2015/0255989 A1 Sep. 10, 2015

Related U.S. Application Data

(60) Provisional application No. 61/947,701, filed on Mar. 4, 2014.

(51) Int. Cl.
*H01F 27/42* (2006.01)
*H01F 37/00* (2006.01)
*H01F 38/00* (2006.01)
*H02J 5/00* (2016.01)
*H04B 5/00* (2006.01)
*H01F 38/14* (2006.01)
*H02M 7/217* (2006.01)
*H02J 50/12* (2016.01)
*H02J 7/00* (2006.01)

(52) U.S. Cl.
CPC .............. *H02J 5/005* (2013.01); *H01F 38/14* (2013.01); *H02J 7/0086* (2013.01); *H02J 50/12* (2016.02); *H02M 7/217* (2013.01); *H04B 5/0037* (2013.01)

(58) Field of Classification Search
CPC .......... H02J 5/005; H02J 7/0086; H02J 50/12; H01F 38/14; H02M 7/217; H04B 5/0037
USPC ........................................................ 307/104
See application file for complete search history.

(56) References Cited

U.S. PATENT DOCUMENTS

2011/0285349 A1    11/2011    Widmer et al.

FOREIGN PATENT DOCUMENTS

| JP | 2010-104088 | * | 5/2010 |
| JP | 2010104088 A | | 5/2010 |
| JP | 2013005596 A | | 1/2013 |
| WO | WO2013/136330 A1 | | 9/2013 |

OTHER PUBLICATIONS

European Patent App. No. 15000603.9, Search Report, dated Jul. 13, 2015, pp. 1-5.
English abstract, JP2013005596 A, Jan. 7, 2013, pp. 1-2.
(Continued)

*Primary Examiner* — Richard Tan
(74) *Attorney, Agent, or Firm* — Foley & Lardner LLP (57) ABSTRACT

A device includes support for wireless power transfer. The device may control the timing of switching devices in a rectifier circuit and implement resonant tuning techniques that facilitate the wireless power transfer, e.g., by purposefully introducing a real or complex impedance chosen to meet a current operating goal. The device may use the techniques in connection with wireless charging or wireless provision of power to run the device, as examples.

20 Claims, 6 Drawing Sheets (56) References Cited

OTHER PUBLICATIONS

Office Action for Chinese Patent Application No. 201510095572.7, dated May 3, 2017, 10 pages.
Third Office Action for Chinese Patent Application No. 201510095572.7, dated Nov. 27, 2017, 19 pages (with machine translation into English).

* cited by examiner

RESONANT TUNING THROUGH RECTIFIER TIME SHIFTING

CROSS REFERENCE TO RELATED APPLICATIONS

This application claims priority to provisional application Ser. No. 61/947,701, filed Mar. 4, 2014, which is incorporated by reference in its entirety.

TECHNICAL FIELD

This disclosure relates to power transfer. This disclosure also relates to circuit tuning for improving efficiency of wireless power transfer.

BACKGROUND

Rapid advances in electronics and communication technologies, driven by immense customer demand, have resulted in the widespread adoption of an immense variety of electronic devices, such as smartphones, tablet computers, and music players. Many such devices obtain power from a limited energy supply, such as a rechargeable battery. Effective and efficient wireless power transfer to these devices is one goal.

DETAILED DESCRIPTION

Figure 1:
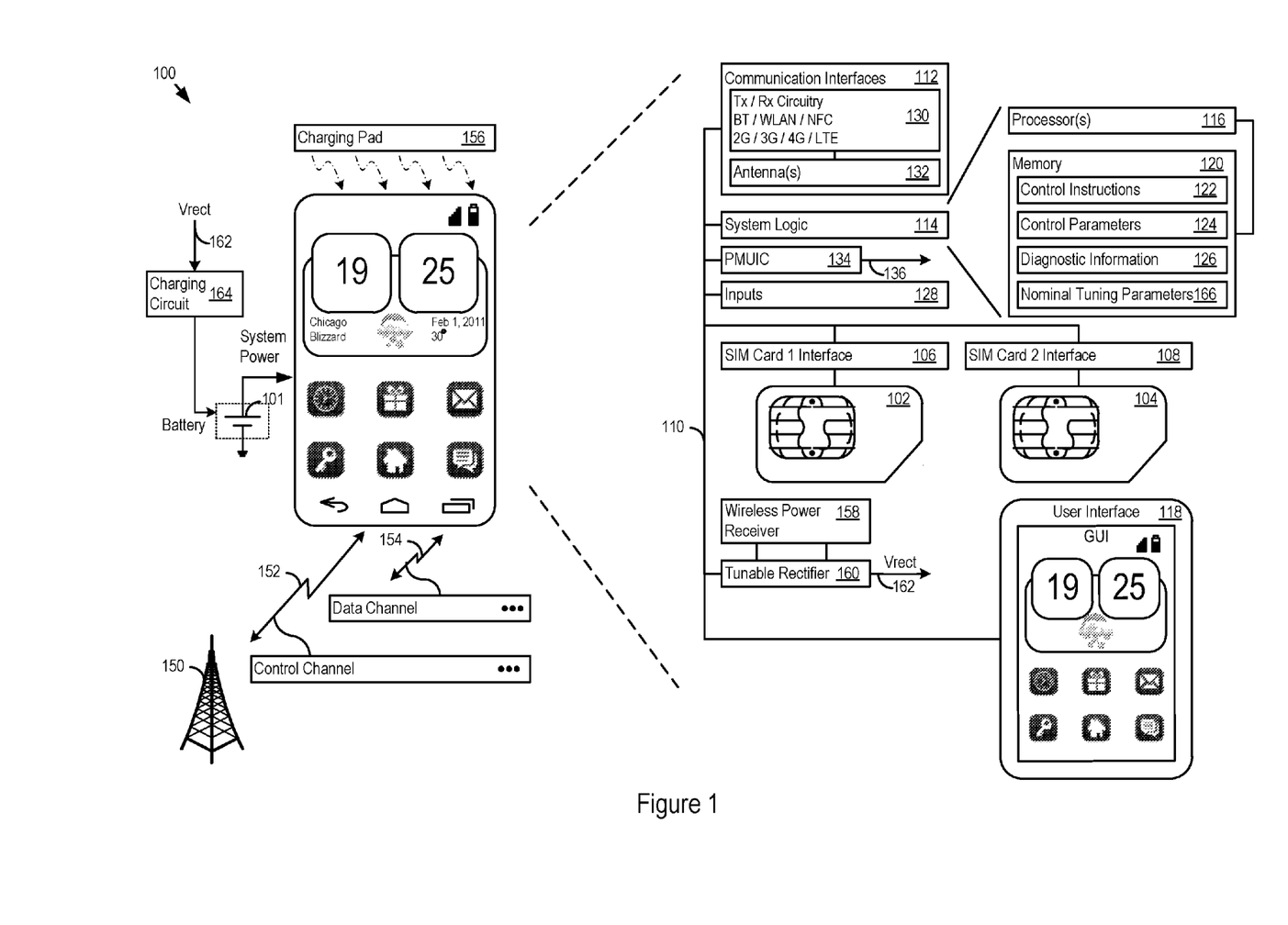
FIG. 1 shows an example of a device that may include a tunable rectifier circuit for obtaining wireless power.

FIG. 1 shows an example of user equipment 100 ("UE 100"). The UE 100 is a smartphone in this example, but the UE may be any electronic device. The techniques described below regarding resonant tuning may be implemented in a wide array of different types of devices. Accordingly, the smartphone example described below provides just one example context for explaining the resonant tuning techniques, e.g., in connection with wireless power transfer (WPT) to the UE 100.

WPT benefits from resonant tuning techniques that achieve high Quality (Q) matching between the transmitter and the receiver, to obtain high efficiency and good range. The resonant tuning techniques facilitate obtaining and maintaining a high Q even given the susceptibility of the tuning to wide component tolerances, the effects caused by the manner in which an individual may hold a device that includes WPT capability, and other effects that may dynamically affect the tuning. The resonant tuning techniques change the operating properties of a rectifier which receives a WPT signal input. The techniques change the operating properties in counterintuitive ways, such as by operating the rectifier in manners other than strict zero voltage switching.

By adjusting switching timing of the rectifier, the resonant tuning techniques may purposefully introduce a complex impedance as seen by a wireless power receiver, to help achieve a particular operating goal. Examples of operating goals include improving a) efficiency; b) tuning for b) maximizing power transfer, e.g., by maximizing the rectifier output; and c) maximizing load regulation, e.g., by keeping the rectifier output flat across a range of loads. The impedance that is introduced may vary according to which operating goal is currently sought, and which may change at any time during operation of the device. The resonant tuning techniques may facilitate achieving other operating goals as well, in addition to those noted above.

A controller may retune the complex impedance at any time. For example, the controller may retune the complex impedance on any desired interval, or on any regular or irregular schedule during operation of the device. Thus, as the load changes, for instance, the controller may measure the load and re-adjust the complex impedance to continue working toward the current tuning goal.

Returning to FIG. 1, as one example, UE may be a 2G, 3G, or 4G/LTE cellular phone capable of making and receiving wireless phone calls, and transmitting and receiving data using 802.11 a/b/g/n/ac/ad ("WiFi"), Bluetooth (BT), Near Field Communications (NFC), or any other type of wireless technology. The UE 100 may be a smartphone that, in addition to making and receiving phone calls, runs any number or type of applications. UE may, however, be virtually any device that consumes energy, including as additional examples a driver assistance module in a vehicle, an emergency transponder, a pager, a watch, a satellite television receiver, a stereo receiver, a computer system, music player, laptop or tablet computer, home appliance, or virtually any other device.

The UE 100 may draw energy from numerous different sources. As one example, the UE 100 may draw energy from the battery 101. Other sources of energy include Wireless Power Transfer (WPT) energy sources. In that respect, described further below are techniques for harvesting power from wireless signals.

Continuing the example in FIG. 1, the UE 100 communicates with a network controller 150, such as an enhanced Node B (eNB) or other base station. The network controller 150 and UE 100 establish communication channels such as the control channel 152 and the data channel 154, and exchange data. The UE 100 may be exposed to many other sources of wireless signals as well, e.g., from a wireless charging pad 156, and wireless signals may be harvested in conjunction with the WPT and resonant tuning techniques described below.

In the example of FIG. 1, the UE 100 supports one or more Subscriber Identity Modules (SIMs), such as the SIM1 102 and the SIM2 104. Electrical and physical interfaces 106 and 108 connect SIM1 102 and SIM2 104 to the rest of the user equipment hardware, for example, through the system bus 110.

The UE 100 includes communication interfaces 112, system logic 114, and a user interface 118. The system logic 114 may include any combination of hardware, software, firmware, or other logic. The system logic 114 may be implemented, for example, with one or more systems on a chip (SoC), application specific integrated circuits (ASIC), discrete analog and digital circuits, and other circuitry. The system logic 114 is part of the implementation of any desired functionality in the UE 100.

In that regard, the system logic 114 may exercise control over a tunable rectifier 160 that receives a wireless power input signal from a wireless power receiver 158. The wireless charging pad 156 or another power source may generate the wireless power input signal. The output of the tunable rectifier 160 is the wireless power output signal 162, Vrect.

In particular, the system logic 114 may adjust the ON and OFF switching timing for switches, such as synchronous rectifier Field Effect Transistors (FETs) in the tunable rectifier 160. In one implementation, the system logic 114 may control variable voltage sources to tune the amplitude of their voltage outputs for comparison by switching control circuitry in the tunable rectifier 160. The switching control circuitry may include operational amplifiers, comparators, or other types of differential amplifiers, and the switching timing varies in response to the amplitude provided by the variable voltage sources.

The switching control circuitry is responsive to the amplitude set for the variable voltage sources, in comparison to the received wireless power input signal. The switching control circuitry responsively turns the switches ON and OFF, e.g., by asserting and de-asserting gate control signals to the FETs that turn the FETs ON and OFF. The tuning may facilitate achieving higher efficiencies or the greatest Vrect output, as examples.

The system logic 114 may further facilitate, as examples, decoding and playing music and video, e.g., MP3, MP4, MPEG, AVI, FLAG, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The user interface 118 and the inputs 128 may include a graphical user interface (GUI), touch sensitive display, voice or facial recognition inputs, buttons, switches, speakers and other user interface elements. Additional examples of the inputs 128 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 114 may include one or more processors 116 and memories 120. The memory 120 stores, for example, control instructions 122 that the processor 116 executes to carry out desired functionality for the UE 100, such as adjusting the amplitudes of the variable voltage sources to change switching timing within the tunable rectifier 160. The control parameters 124 provide and specify configuration and operating options for the control instructions 122. The control parameters 124 may, e.g., specify the available programmable amplitude settings for resonant tuning techniques described below. The memory 120 may also store any BT, WiFi, 3G, or other data 126 that the UE 100 will send, or has received, through the communication interfaces 112. The UE 100 may include a power management unit integrated circuit (PMUIC) 134. In a complex device like a smartphone, the PMUIC 134 may be responsible for generating, e.g., thirty (30) different power supply rails 136 for the circuitry in the UE 100.

The memory 120 may also store nominal tuning parameters 166. The nominal tuning parameters 166 may specify switching timing for the tunable rectifier 160 for any pre-defined operating scenario of the UE 100. For example, the switching timing may apply to startup of the UE 100, during normal operation of the UE 100, during high power or low power consumption of the UE 100 (or any other power consumption mode as determined by comparison of current power consumption against one or more power thresholds), or during any other pre-defined operating scenarios. In some implementations, the nominal tuning parameters 166 may be stored in a One Time Programmable (OTP) memory, with the nominal tuning parameters 166 determined, e.g., during a factory calibration process. The nominal tuning parameters 166 may direct the system logic 144 to advance or delay switching timing of the tunable rectifier 160 away from zero voltage switching, in order to purposefully introduce a complex impedance that facilitates meeting a current operational goal, e.g., maximum power transfer, maximum efficiency, or improved load regulation.

In the communication interfaces 112, Radio Frequency (RF) transmit (Tx) and receive (Rx) circuitry 130 handles transmission and reception of signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

As just one of many possible implementation examples, the UE 100 may include (e.g., for the communication interface 112, system logic 114, and other circuitry) a BCM59351 charging circuit, BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processer or a BCM25331 Athena™ baseband processor. These devices or other similar system solutions may be extended as described below to provide the additional functionality described below. These integrated circuits, as well as other hardware and software implementation options for the UE 100, are available from Broadcom Corporation of Irvine Calif.

Figure 2:
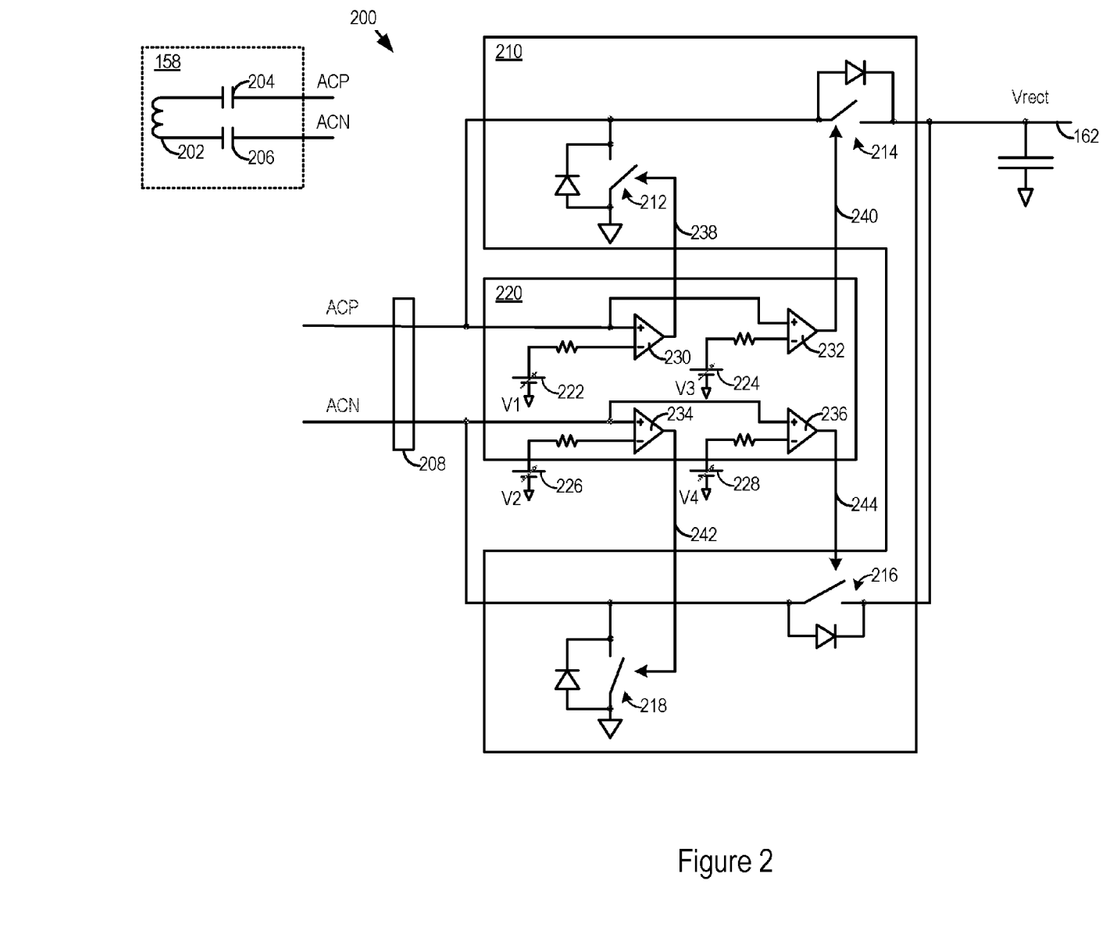
FIG. 2 is an example of a tunable rectifier circuit for obtaining wireless power.

FIG. 2 is a specific example of a tunable rectifier circuit 200 ("rectifier circuit 200") for harvesting wireless power with increased efficiency. As just one example, the rectifier circuit 200 may harvest 6.78 MHz Alliance for Wireless Power (A4WP) power transmissions. The rectifier circuit 200 facilitates efficiency improvements in receiving the transmitted energy and delivering it (e.g., as the rectified Direct Current (DC) voltage Vrect) to subsequent energy consuming stages in the device, such as a battery charging circuit 164 for the battery 101.

Wireless power transmission suffers from efficiency losses at several stages, e.g., from converting a power source into a radio frequency (RF) wireless power signal transmission, receiving the RF flux of the wireless power signal, and converting the RF flux into a usable DC voltage in the receiving device. The wireless power receiver 158 employs magnetic resonance achieved through matching the inductance 202 and capacitance 204 and 206 to the transmitter system to obtain a high Q receiver that is very responsive to the fundamental frequency (e.g., 6.78 MHz) of the wireless power signal.

In that regard, the inductance 202 may be a coil that receives the flux of the wireless power signal. The inductance 202 may be, for example, one or more turns of a conductor on a printed circuit board, or another type of antenna. The inductance 202 produces an Alternating Current (AC) current and the capacitors 204 and 206 are tuned with respect to the inductance 202 to achieve the resonance that results in substantial responsiveness to the wireless power signal. The wireless power receiver 158 provides the AC current into the rectifier circuit 200, represented in FIG. 2 as the AC current signal AC Positive (ACP)/AC Negative (ACN).

The rectifier circuit 200 turns the AC current into a DC voltage, Vrect. Vrect may provide energy for any subsequent processing circuitry. In one implementation, the rectifier circuit 200 is integrated into an integrated circuit chip, though in other implementations discrete components may be used. The rectifier circuit 200 includes a wireless power signal input 208 that carries a wireless power input signal (e.g., ACP/ACN). A switch network 210 is connected to the wireless power signal input 208. The switch network 210 includes switches (e.g., switches 212, 214, 216, and 218) arranged to rectify the wireless power input signal to provide a wireless power output signal. The switches 212-218 may be Metal Oxide Semiconductor FETs (MOSFETs), for example, or other types of transistors or other types of switches.

FIG. 2 shows the body diodes of the FETs. The body diodes may have relatively poor conductivity, such that even if the FETs turn on after the body diodes become conductive, the body diodes do not significantly affect the impedance tuning of the rectifier circuit 200. In other implementations, switches without body diodes may be used. For example a FET switching structure including cascode connected transistors may implement the switches.

Control circuitry 220 is in communication with the switch network 210. The control circuitry 220 controls the ON and OFF states of the switches 212-218 to rectify the wireless power input signal using switching control outputs 238, 240, 242, and 244. The wireless power output signal 162, Vrect, is generated, e.g., as a full wave rectified version of the wireless power input signal.

Note also that variable voltage sources 222, 224, 226, and 228 are present. The variable voltage sources 222-228 provide variable voltage outputs to the control circuitry 220. In some implementations, like that shown in FIG. 2, the control circuitry 220 is a comparator network, and the variable voltage sources 222-228 provide the variable voltage outputs to the comparators 230, 232, 234, and 236 (or another type of difference amplifier, operational amplifier, or other comparison circuit). The comparators 230-236 receive the AC current signal ACP/ACN and compare it to the output of the particular variable voltage source also connected to that comparator. As will be explained below, the variable voltage sources 222-228 modify switching timing for one or more of the switches 212-218, by modifying comparison thresholds for the comparators 230-236. In other implementations, one or more fixed voltage sources may take the place of one or more of the variable voltage sources, e.g., when tunability of all of the variable voltage sources will not be implemented.

Figure 3:
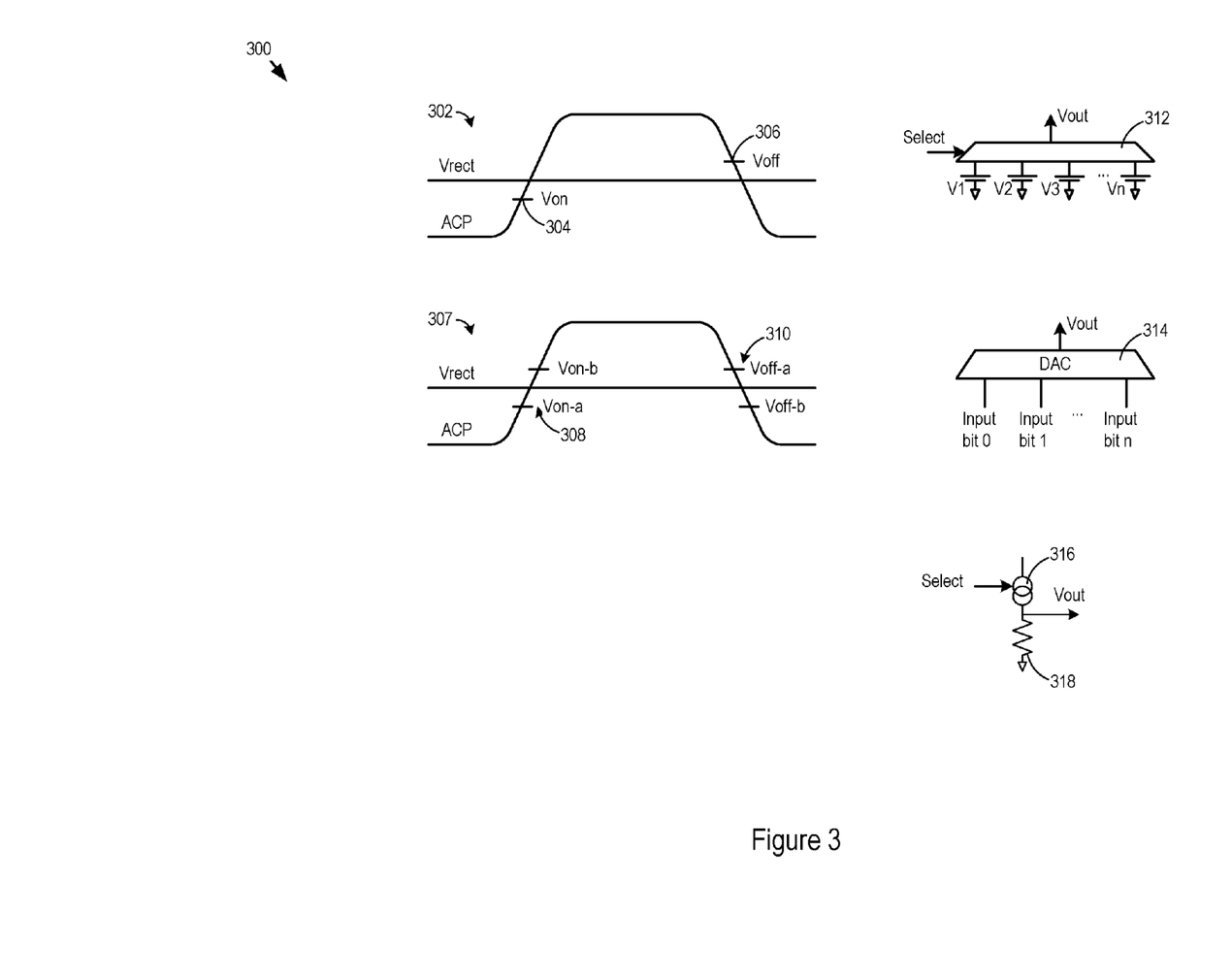
FIG. 3 shows example switching waveforms.

FIG. 3 shows example switching waveforms 300. The control circuitry 220 controls the ON/OFF timing of the switches 212-218. In one implementation, the control circuitry 220 purposefully deviates rectifier operation away from zero volt switching.

The switching waveform 302 shows an ON threshold 304, labeled Von. As ACP rises toward Vrect, and passes the ON threshold 304, the control circuitry 220 may close the switches 214 and 218 to cause ACP to provide energy toward the output, Vrect. As ACP falls through the OFF threshold 306, Voff, (and ACN is rising), the control circuitry 220 may close the switches 212 and 216 to cause ACN to provide energy toward the output, Vrect.

The control circuitry 220 may turn ON and OFF the switches 214 and 218 as a pair, and turn ON and OFF the switches 212 and 216 as a pair. Doing so operates the rectifier circuit 200 as a full wave rectifier. Turning switches ON and OFF as a pair may include turning the switches ON and OFF at substantially the same time, or with comparison to substantially the same reference voltages provided by the variable voltage sources. That is, V1 and V4, and V2 and V3 may be set to approximately the same reference voltages. In other implementations, however, some or all of the variable voltage sources 222-228 may be set independently, and the switches 212-218 may thereby turn ON and OFF at independent times due to the different comparison thresholds set at the comparators 230-236. The adjustments to the ON and OFF timing result in time skewing the ON and OFF states of the switches 212-218.

The rectifier circuit 200 may implement tunability of some or all of the variable voltage sources, over one or more voltage tuning ranges. The switching waveform 307 shows an ON tuning threshold 308 that ranges between Von-a and Von-b. The switching waveform 307 also shows an OFF tuning threshold 310 that ranges between Voff-a and Voff-b.

The tuning thresholds for any of the variable voltage sources 222-228 may be established in many different ways. FIG. 3 shows several examples. For instance, the turning thresholds may be set by having the control logic switch in a selected voltage from among multiple available individually pre-set voltages. An analog multiplexer 312, responsive to a voltage selection input, may perform the switching, as just one example, As another example, the control logic may provide a digital control bits (as a voltage selection input) to a Digital to Analog Converter (DAC) 314. The DAC 314 may then generate multiple different voltages, as chosen by the control logic. As yet another example, the control logic may adjust a programmable current source 316 using a voltage selection input to increase or decrease current flowing through a reference resistor 318. The increase or decrease in current results in a change in the variable voltage provided to the control circuitry 220.

In some implementations, the output of the comparators 230-236 may also influence, control, or select the voltage provided by a particular variable voltage source 222-228. As a specific example, when the output of the comparator 232 goes high, then the output of the variable voltage source 224 should change to Voff. In that regard, the output of the comparator 232 may provide a selection input (e.g., into the multiplexer 312) to select appropriate output for the variable voltage source 224. A high output from the comparator 232 may then select the Voff output for the variable voltage source 224. Similarly, as ACP falls through Voff and the output of the comparator 232 goes low, the low output may cause the multiplexer 312 to again provide Von as the output of the variable voltage source 224. However in other implementations, the system logic 114 may control the variable voltage sources to select (and make adjustments to) Von and Voff as outputs of the variable voltage sources 222-228.

The ON and OFF thresholds may be in the range of plus/minus 50 mV to plus/minus 100 mV around Vrect, i.e., a 100 mV to 200 mV range around Vrect. The system logic 114 may implement adjustment increments to the ON and OFF thresholds of, e.g., 5 mV. Other systems may implement other ranges and other increments.

The system logic 114 may analyze the AC current signal ACP/ACN and decide when to turn the switches 212-218 ON and OFF. More particularly, the system logic 114 may determine how to set the variable voltage sources 222-228 for efficient power transfer or other optimization goal.

In one implementation, the system logic 114 tunes the variable voltage sources 222-228 in order to present as close to a purely resistive load as possible to the wireless power receiver 158. In that regard, the system logic 114 may measure and attempt to reduce any phase shift present between the AC current signal ACP/ACN and the ACP/ACN voltage. As the phase shift between current and voltage increases, less real power is delivered through Vrect. Accordingly, the system logic 114 may adjust the voltage outputs of the variable voltage sources 222-228 to change the ON/OFF timing of the switches 212-218 to adjust the timing of delivery of the AC current signal ACP/ACN to the Vrect output. The timing adjustments attempt to reduce the phase relationship between current and voltage, in an attempt to maximize the real power delivered through Vrect. The timing adjustments may exist over time scales on the order of nanoseconds to microseconds, for instance, though finer and coarser timing adjustments may also be made. Alternatively, the system may measure the received power (Prx), and compare the received power with the transmitted power (Ptx). The system may then search, e.g., by adjusting switching timing and measuring the resulting effect on Prx, in an attempt to maximize (as one possible operational goal) the quantity Prx/Ptx. The system may, as an example, receive a message specifying Ptx over a communication interface (e.g., a Bluetooth interface) between the control logic 114 and the charging pad 156.

Switching ON late (e.g., after ACP exceeds Vrect) allows ACP to rise faster. When the switches turn ON, ACP is shorted through the switches to Vrect. On the other hand, switching early (e.g. before ACP reaches Vrect) connects the higher voltage Vrect to ACP, and tends to slow the rise of ACP. Accordingly, the system logic 114 may adjust when the switches 212-218 turn ON and OFF, which impacts how fast ACP rises relative to current actually flowing into Vrect. In this way, the system logic 114 changes the current and voltage phase relationship in an attempt to increase efficiency by keeping current in-phase with voltage.

The system logic 114 may, as examples, implement open loop control, closed loop control, or a combination of both. With open loop control, the system logic 114 may, for instance, monitor the load, determine how much to change the switch timing, and implement that change. With closed loop control, for instance, the system logic 114 may dither around the complex impedance that helps achieve the current operational goal, e.g., for maximum power transfer tuning the rectifier circuit 200 so that Vrect is maximized. The closed loop control may thereby track to the complex impedance that best meets the operational goal.

As noted above, by adjusting switching timing of the rectifier circuit 200, the system logic 114 (or other control circuitry) may purposefully introduce a complex impedance as seen by a wireless power receiver, to help achieve a particular operating goal. Example operating goals include improving a) efficiency; b) tuning for maximizing power transfer, e.g., by maximizing the rectifier output, Vrect; and c) maximizing load regulation, e.g., by keeping the rectifier output flat across a range of loads. The system logic 114 may facilitate maximum power transfer, for instance, by introducing phase shift by changing switching timing, thereby compensating for impedance changes as the received load power varies. By maximizing power transfer, efficiency also improves. Note that while a direct measurement of current and voltage is one option, e.g., by sensing current through the switches, or through sense resistors in series with ACP and ACN, another option (as noted above) is to have the receiver measure real power to the load, and have the power transmitter communicate the real power transmitted.

Figure 4:
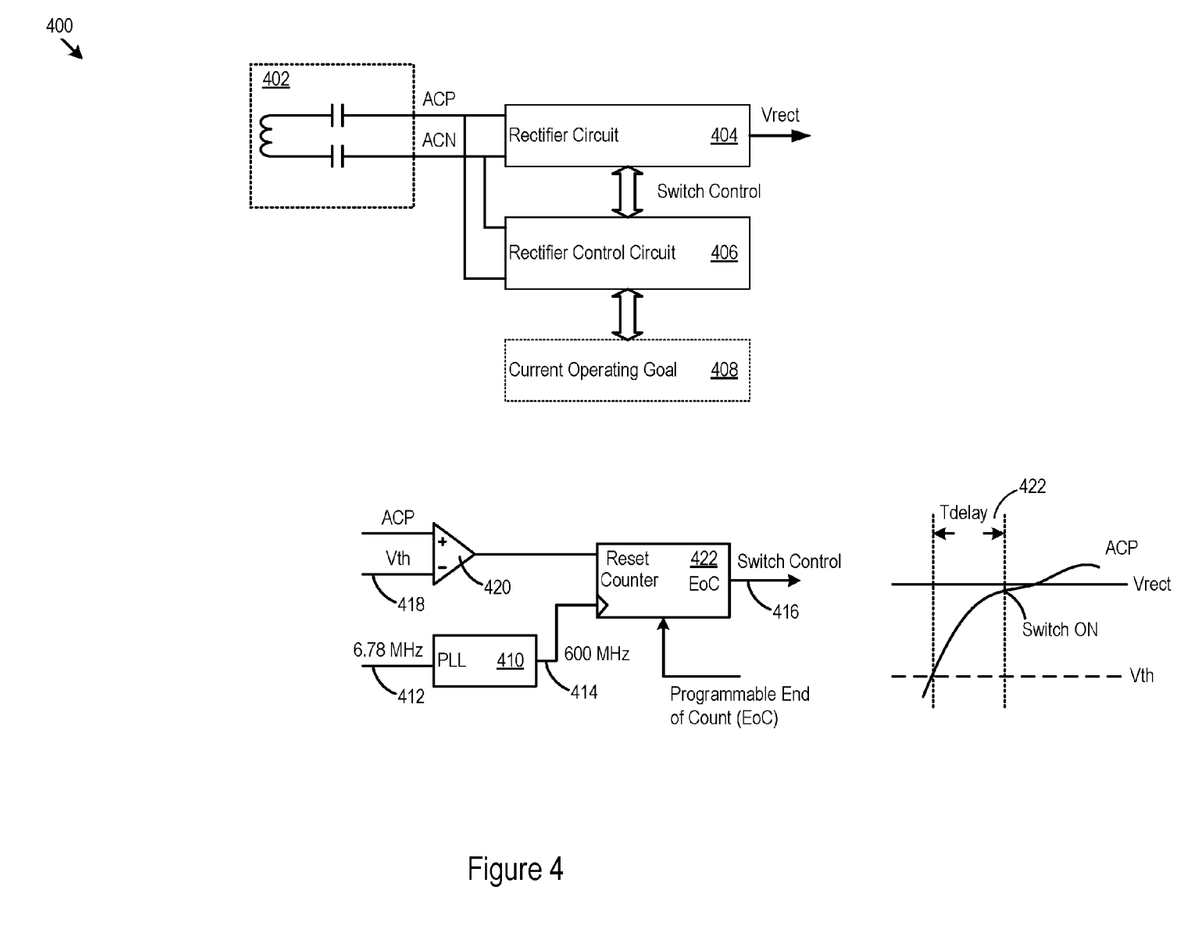
FIG. 4 shows an example tunable rectifier circuit.

FIG. 2 provided one example implementation of a tunable rectifier, using comparators to influence the switching timing of the switches in the rectifier circuit 200. Note, however, that the tunable rectifier may vary widely in implementation. FIG. 4 shows a more general example of a tunable rectifier 400 in which a wireless power receiver 402 provides a wireless power input signal ACP/ACN. The rectifier circuit 404 receives the wireless power input signal and performs rectification to obtain the wireless power output signal, Vrect.

The rectifier control circuit 406 guides the operation of the rectifier circuit 404. The rectifier control circuit 406 purposefully introduces selected complex impedances at the rectifier circuit 404 to help achieve a currently selected operating goal 408. One way in which the rectifier control circuit 406 may do so is to introduce switching delays to the switches in the rectifier circuit 404.

The rectifier circuit 404 may be, as examples, a full wave rectifier circuit (e.g., as in FIG. 2) or a half wave rectifier circuit. The half wave rectifier circuit may be implemented, e.g., with a pair of switches with configurable switching timing that is responsive to, e.g., variable voltage sources. As just a few other implementation examples for the tunable rectifier, the switches may be FETs, diodes, or other switches; the rectifier circuit 200 may be a full wave or half wave rectifier; the switching timing may be adjustable on the rising edge of ACP/ACN, the falling edge of ACP/ACN, or both; and the switching delay may be implemented by variable voltage sources provided to, e.g., comparators, by adjustable analog delay lines, by digitally delaying switching signals to the switches.

Regarding digital delay of switching signals, in one implementation, a Phase Locked Loop (PLL) 410 or other timing circuit upconverts the fundamental frequency of ACP/ACN to a faster clock signal frequency locked to the fundamental frequency. For instance, the PLL 410 may upconvert from a 6.78 MHz clock 412 to 600 MHz clock 414. A switching signal 416 to any switch may then be delayed in terms of cycles of the faster clock signal to provide any desired degree of control granularity over the switching timing.

For instance, the system logic 114 may set a threshold voltage 418, Vth, lower than Vrect, and, e.g., lower than any desired switching point. The comparator 420 compares ACP to Vth. When ACP is below Vth, the comparator 420 holds the counter 422 in reset. When ACP rises above Vth, the counter 422 begins to count according to the 600 MHz clock 414. When the counter 422 reaches the programmable end of count value, the counter 422 asserts the switch control signal 416 and the switch turns ON. In this way, a programmable delay time 422, Tdelay, may be implemented to set the switch turn ON time to any selected time after ACP rises above Vth.

Figure 5:
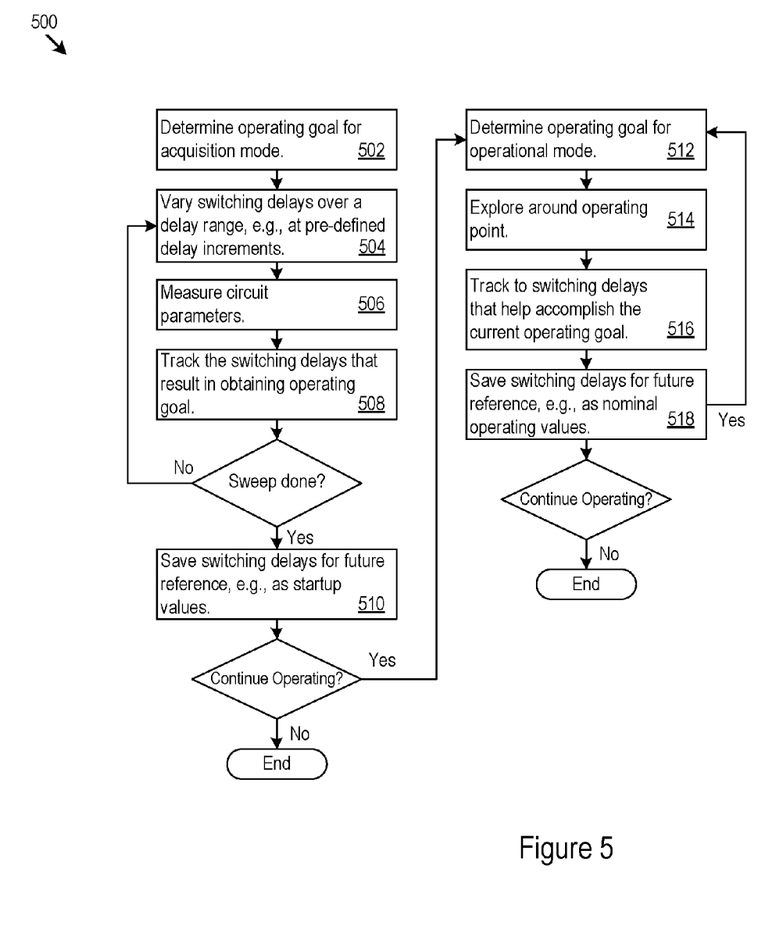
FIG. 5 shows example logic that a device may implement to provide an acquisition mode and an operating mode of operation.

FIG. 5 shows example logic 500 that a device may implement to provide an acquisition mode and an operating mode of operation. In an acquisition mode of operation, the system logic 114 may determine an acquisition operating goal (502), as examples maximum power transfer, or power transfer to Vrect above a predetermined threshold amount. In acquisition mode, the system logic 114 may sweep switching delays, e.g., over a pre-define delay range at, e.g., pre-defined delay increments for any particular switch or combination of switches in the rectifier circuit 200 (504). At each set of switching delays presently implemented, the system logic 114 may measure circuit parameters for a given length of time (506), e.g., a specified number of clock cycles, or a specified duration. Examples of circuit parameters include the current and voltage phase of ACP/ACN, the magnitude of Vrect, the complex impedance presented by the switching circuit, and other parameters that bear upon the current operating goal. The system logic 114 thereby locates the switching delays that help achieve the current operating goal (508) as informed by the measured circuit parameters. For instance, for maximizing power transfer, the sweep may find the switching delay for each switch at which Vrect is largest, on average, over the measurement period. The switching delays that achieve the acquisition operating goal may be saved, e.g., in the memory 120, for use as a subsequent starting point, or for any other future use (510).

After acquisition mode, the system logic 114 may transition to an operational mode that has the same or different operational goal as acquisition mode (512). The current operating goal may change at any time. In operational mode, the system logic 114 may, during operation of the rectifier circuit 200, explore around the current operating point (e.g., by dithering around previously set switching delays) (514). The exploration may facilitate tracking to the switching delays that help accomplish the current operating goal, e.g., as the load changes (516). The switching delays that help accomplish any particular operating goal may be saved for future reference, e.g., in the memory 120 (518). There may be a library of switching delays established in the device as reference switching delays to implement for any particular operating goal.

In one implementation, the exploration may start with switching delays at one extreme, e.g., the shortest switching delays. The exploration may then increase the delays and walk up the result curve for the current operating goal (e.g., maximum power transfer), until the set of parameters is reached where the result begins to fall off. That set of parameters may become the current operating point. The exploration may then search around the current operating point to facilitate tracking toward the current operating goal in the face of, e.g., load or other changes.

As noted above, in some implementations, when the UE 100 is a predetermined operating mode, e.g., starting up, booting, or is another predetermined a state, the system logic may set the switching delays to a startup set of delays. The startup set of delays may be obtained from the nominal tuning parameters 166 in the memory 120, or form other source (e.g., the PTU over a communication like, such as a Bluetooth link). Typically, prior to nominal operation, power consumption is much lower, and the switching delays that provide a desired amount of power transfer via Vrect are more broadband in nature in that a wider range of delays will obtain the desired power transfer. As a result, the UE 100 may receive sufficient power during bootup to provide power for subsequent system operation, and perform tracking to help meet the current operational goal, e.g., maximum power transfer.

As power consumption increases, the load increases, and the load on the inductance 202 in the wireless power receiver 158 increases. The impedance of the load will have significant effects on power transfer and efficiency. According, and as noted above, the system logic 114 may measure circuit parameters during the operation of the UE 100 and dynamically tune the switching delays in an attempt to continue tracking the current desired operational goal.

Figure 6:
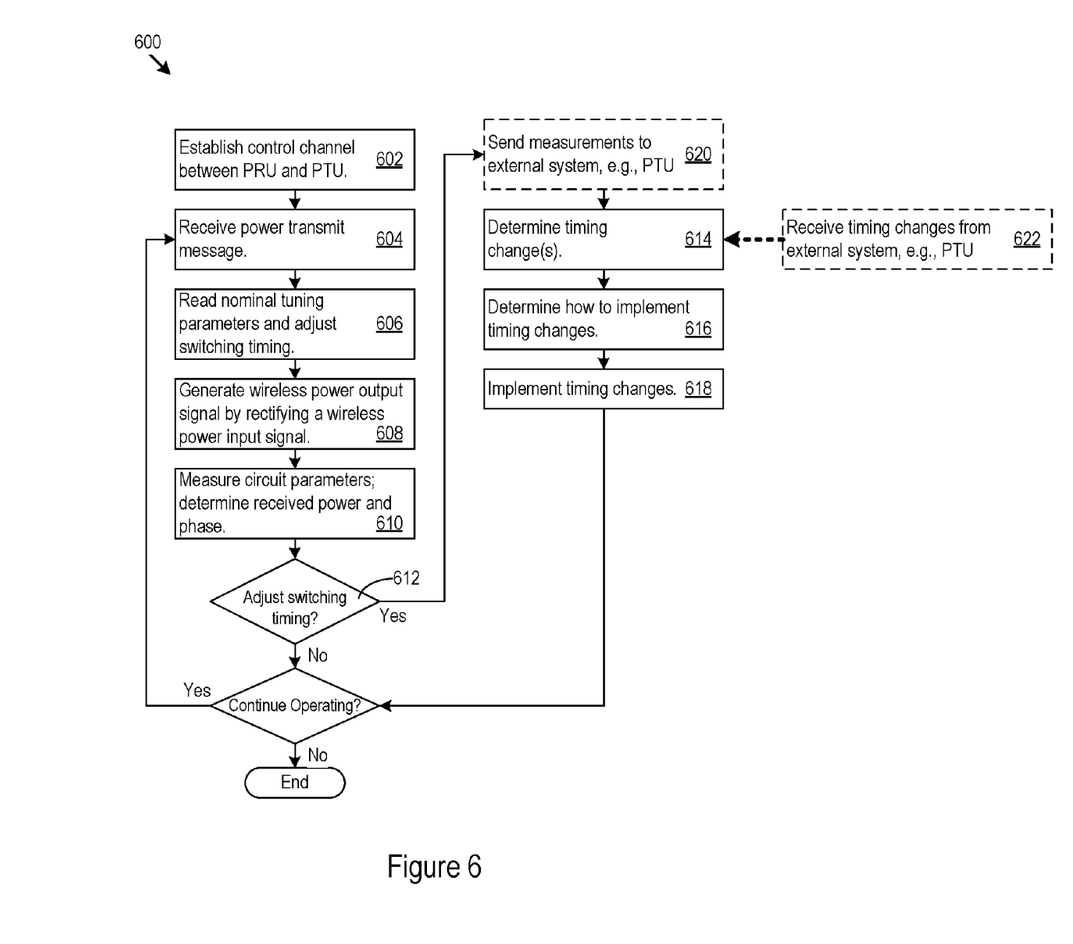
FIG. 6 shows example logic that a device may implement to control switching timing in a tunable rectifier circuit.

FIG. 6 shows one example of logic 600 that a device may implement to control switching timing in a tunable rectifier circuit. Note that the UE 100, as a power receiving unit (PRU), may establish a control channel to the power transmitting unit (PTU), e.g., the system controlling the wireless charging pad 156 (602). The control channel may take the form of communications sent over a BT channel between the PRU and the PTU, for instance. The PTU may send the PRU a power transmit message indicating how much power (e.g., 5 W) the PTU is transmitting. The PRU receives the power transmit message (604).

The PRU reads the nominal tuning parameters 166 and sets the switching timing accordingly. For instance, the PRU may control the outputs of the variable voltage sources 222-228 to, e.g., select or set initial values of Von and Voff (606). The PRU thereby configures the tunable rectifier to generate a wireless power output signal, Vrect (608). For example, Vrect may result from full wave rectification of the wireless power input signal ACP/ACN.

The PRU may measure circuit parameters, e.g., by making current and voltage measurements to determine the phase relationship between ACP/ACN current and voltage, measuring Vrect, and determining how much power the PRU is receiving (610). The PRU may then determine whether to make adjustments to switching timing to attempt to meet an operational goal, such as to maximize the amount of power transfer (612). For example, if the amount of power received is less than a threshold amount of the amount of power transmitted (e.g., less than 50%), then the PRU may make switching timing adjustments in an attempt to increase the amount of power received.

In that respect, the PRU may determine one or more timing changes for the switches 212-218, e.g., individually or as rectifying pairs (e.g., 212 and 216; and 214 and 218) (614). The timing changes may be responsive to and measured circuit parameters, such as measured phase difference between voltage and current, and the timing changes may be selected because the changes are expected to help meet an operational goal, e.g., by reducing phase offset to maximize power transfer. If the PRU will make adjustments, the PRU determines how to implement the timing changes, for instance by setting one or more new output voltages for the variable voltage sources 222-228 (616), and then implements the timing changes (618). For instance, to cause switch 214 to turn on earlier, the PRU may reduce the Von voltage for the variable voltage source 224. That is, the PRU sets the output voltages to skew the ON/OFF timing of the switches 212-218.

In other implementations, the PRU may communicate to the PTU a power reception message that includes measured circuit parameters, as examples: how much power the PRU is currently receiving; measurements of voltage; measurements of current; and measurements of phase difference (620). Then, the PTU may determine adjustments to the switching timing, and send a timing control message to the PRU that indicates the timing adjustments that the PRU should make (622). The timing adjustments may take the form of timing offsets for one or more switches, or as voltage outputs to which to set the variable voltage sources 222-228, as examples.

In some implementations, the system logic 114 may purposefully introduce changes to the complex impedance of the rectifier circuit 200 for signaling purposes. More particularly, a receiver coil (e.g., the inductance 202) may communicate a message to the transmitter by purposefully changing the switching timing of the rectifier circuit 200 to introduce a particular load as seen by the receiver coil. As a result, the system logic 114 may perform the signaling without physically switching in or out additional components, but instead by changing the switching timing to change the load.

The methods, devices, and logic described above may be implemented in many different ways in many different combinations of hardware, software or both hardware and software. For example, all or parts of the system may include circuitry, such as a controller, a microprocessor, or an application specific integrated circuit (ASIC), discreet logic or other components, including analog circuitry, digital circuitry, or both. The circuitry may be combined on a single integrated circuit or distributed among multiple integrated circuits, or implemented in a multiple chip module. The circuitry may include a processor and instructions for execution by the processor, controller, or other processing device. The instructions may be stored in a medium that is other than a transitory signal, such as a non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in a device, cause the device to perform operations according to any of the description above.

The processing capability may be distributed among multiple system components, such as among multiple circuit modules, such as multiple processors and memories. Parameters, databases, and other data structures may be separately stored and managed, may be incorporated into a single memory or database, may be logically and physically organized in many different ways, and may be implemented in many ways, including as data structures such as linked lists, hash tables, or implicit storage mechanisms. The instructions executed by the processor may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A circuit comprising:
    a wireless power signal input to provide a wireless power input signal;
    a switch network coupled to the wireless power signal input, the switch network comprising switches arranged to rectify the wireless power input signal to provide a wireless power output signal;
    control circuitry in communication with the switch network, the control circuitry configured to:
        respond to a current wireless power transfer operating goal by:
            performing a sweep over a plurality of switching delays for the switch network;
            determining a first switching delay from the plurality of switching delays for meeting the current wireless power transfer operating goal, the first switching delay providing an impedance to introduce to the switch network;
        purposefully introduce the impedance to the switch network using the wireless power input signal; and
        cause the switches to rectify the wireless power input signal to produce the wireless power output signal.

2. The circuit of claim 1, further comprising:
    a variable voltage source in communication with the control circuitry, the variable voltage source operable to modify switching timing for at least one of the switches.

3. The circuit of claim 1, where the control circuitry is operable to modify switching timing by time skewing an ON-state, an OFF-state, or both for at least one of the switches.

4. The circuit of claim 1, where the current wireless power operating goal is maximum power transfer, load regulation, or efficiency.

5. The circuit of claim 1, further comprising:
    a variable voltage source; and where the control circuitry comprises:
    a comparator operable to compare the wireless power signal to the variable voltage source.

6. The circuit of claim 5, where the comparator comprises a switching control output in communication with at least one of the switches.

7. The circuit of claim 1, where:
    the switches comprise a full wave rectifier.

8. The circuit of claim 7, where:
    the control circuitry comprises multiple comparators controlling switching of specific switches in the full wave rectifier.

9. The circuit of claim 8, further comprising:
    multiple variable voltages sources, and where:
    the comparators include individual comparison inputs in communication with individual ones of the variable voltage sources.

10. The circuit of claim 1, where:
    the switches comprise field effect transistors (FETs); and
    the control circuitry comprises difference amplifiers comprising switch control outputs operable to control switching of the FETs.

11. The circuit of claim 10, further comprising:
    multiple independently tunable variable voltage sources that provide first inputs to the difference amplifiers.

12. The control circuit of claim 11, where:
    the control circuitry receives the wireless power signal as a second input to the difference amplifiers.

13. A method comprising:
    determining a current wireless power transfer operating goal;
    receiving a wireless power input signal;
    rectifying the wireless power input signal with a switch network to provide a wireless power output signal;
    providing the wireless power input signal to control circuitry in communication with the switch network; and
    controlling the switch network in response to the current wireless power transfer operating goal by:
        performing a sweep over a plurality of switching delays for the switch network;
        determining a first switching delay from the plurality of switching delays for meeting the current wireless power transfer operating goal, the first switching delay providing an impedance to introduce to the switch network responsive to the operating goal;
        introducing the impedance to the switch network using the wireless power input signal;
        generating a comparison voltage responsive to the first switching delay; and
        changing switch timing of the switch network responsive to a comparison of the wireless power input signal and the comparison voltage.

14. The method of claim 13, where changing switch timing comprises:
changing when a switch control signal is asserted to the switch network, changing when a switch control signal is de-asserted to the switch network, or both.

15. The method of claim 13, where rectifying comprises: full wave rectifying.

16. The method of claim 13, where changing switch timing comprises:
individually changing switch timing of different switches in the switch network.

17. A circuit comprising:
a wireless power signal input to provide a wireless power input signal;
switching transistors coupled to the wireless power signal input and arranged as a full wave rectifier operable to rectify the wireless power input signal into a wireless power output signal;
a power output coupled to the full wave rectifier and configured to provide the wireless power output signal;
a comparator network comprising individual comparators operable to selectively turn ON and turn OFF the switching transistors;
control circuitry configured to perform a sweep over a plurality of switching delays for the switch network in response to a wireless power transfer operating goal, determine a first switching delay from the plurality of switching delays for meeting the current wireless power transfer operating goal, the first switching delay providing an impedance to introduce to the full wave rectifier using the wireless power input signal; and
variable voltage sources configured to provide the individual comparators with tunable voltages responsive to the wireless power transfer operating goal, the individual comparators responsive to the tunable voltages and the wireless power input signal to modify switching timing of the switching transistors.

18. The circuit of claim 17, where:
the wireless power transfer operating goal comprises maximum power transfer from the wireless power input signal to the wireless power output signal.

19. The circuit of claim 17, where:
the wireless power transfer operating goal comprises a load regulation goal for the wireless power output signal.

20. The circuit of claim 17, where:
the wireless power transfer operating goal comprises an efficiency goal.

* * * * *